United States Patent [19]

Fushimi et al.

[11] Patent Number: 5,301,311
[45] Date of Patent: Apr. 5, 1994

[54] CONTROL METHOD FOR PREVENTING INCORRECT RESET OF COMMON RESOURCE AND MULTICOMPUTER SYSTEM EXECUTING THE METHOD

[75] Inventors: Masato Fushimi, Yokohama; Toshinori Hiraishi, Mishima, both of Japan

[73] Assignee: Fujitsu Limited, Kawasaki, Japan

[21] Appl. No.: 700,869

[22] Filed: May 17, 1991

[30] Foreign Application Priority Data

May 18, 1990 [JP] Japan .................................. 2-128323

[51] Int. Cl.$^5$ ...................... G06F 11/00; G06F 13/00
[52] U.S. Cl. ........................................ 395/575; 371/12
[58] Field of Search ........................... 395/575; 371/12

[56] References Cited

U.S. PATENT DOCUMENTS

| | | | |
|---|---|---|---|
| 4,308,580 | 12/1981 | Ohtaki | 364/200 |
| 4,497,026 | 1/1985 | Braschel et al. | |
| 4,841,439 | 6/1989 | Nishikawa et al. | 395/575 |
| 4,930,128 | 5/1990 | Suzuki et al. | 371/12 |

FOREIGN PATENT DOCUMENTS 0281999 8/1988 European Pat. Off. .
0320274 6/1989 European Pat. Off. .

OTHER PUBLICATIONS

European Search Report for Application No. EP 91 10 7395.
Abstract–Japanese Application No. JP870209329.

Primary Examiner—Charles E. Atkinson
Assistant Examiner—Albert Decady
Attorney, Agent, or Firm—Staas & Halsey

[57] ABSTRACT

A control method and system for preventing the incorrect resetting of a common resource in a multicomputer system comprising a plurality of clusters each having a processor and a common memory which each cluster can access. The method includes steps of storing in a common memory an IPL (initial Program Load) generation ID (Identifier) which is unique to an IPL number of each cluster, setting an acquisition ID and the IPL generation ID in the common resource, when the right to use the common resource in the common memory is acquired, and comparing the IPL generation ID when the faulty cluster stops, with the IPL generation ID set in the common resource, and only when the two IPL generation IDs are equal, resetting the right to use the common resource, when the right to use the common resource which the stopped faulty cluster acquires is reset. Thus, when resetting a common resource when a cluster included in a system stops operating due to a fault, incorrect resetting can be prevented, so that the cluster does not reset the right to use the common resource acquired after restart by the IPL.

6 Claims, 8 Drawing Sheets

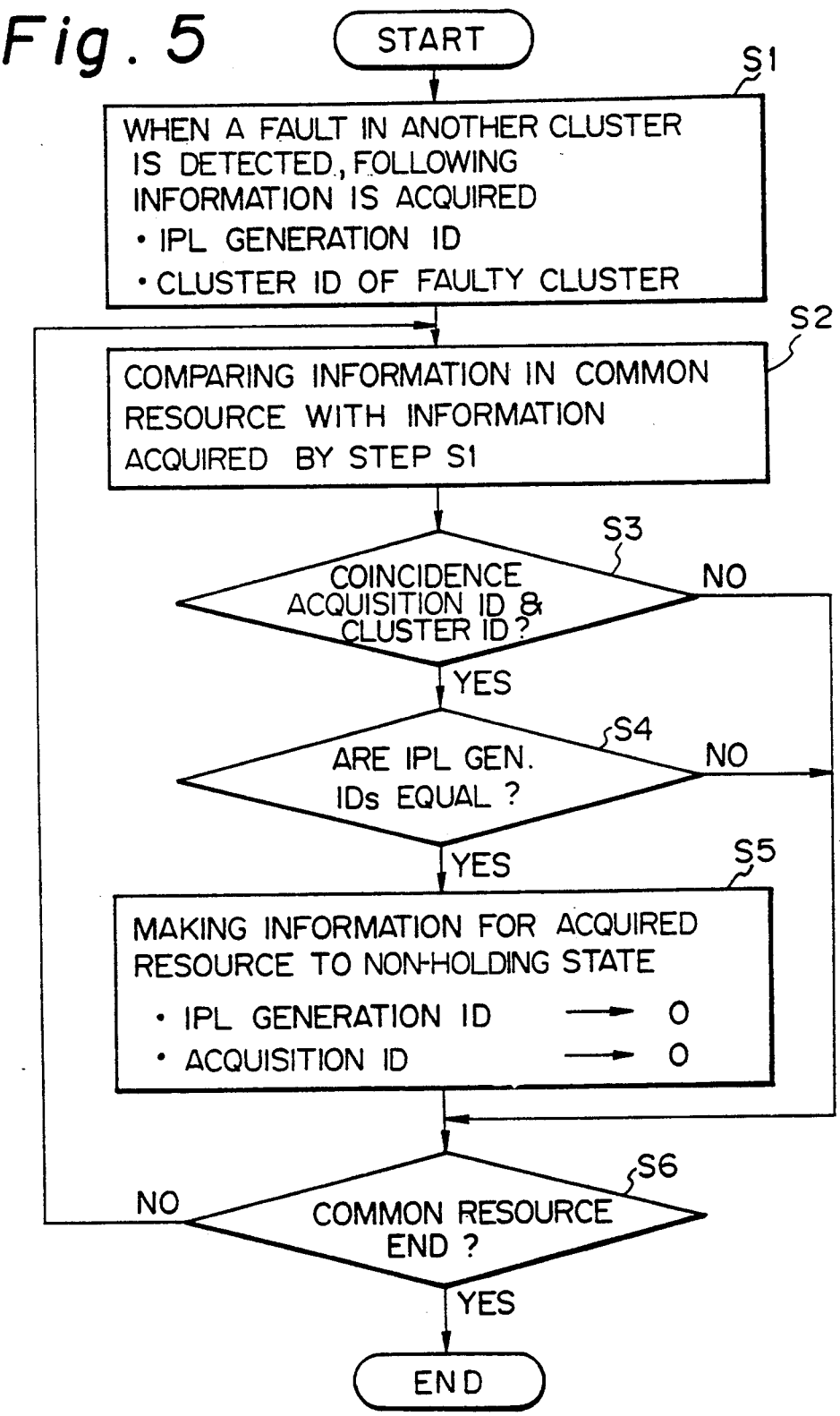

CONTROL METHOD FOR PREVENTING INCORRECT RESET OF COMMON RESOURCE AND MULTICOMPUTER SYSTEM EXECUTING THE METHOD

BACKGROUND OF THE INVENTION

(1) Field of the Invention

The present invention relates to a control method for preventing incorrect resetting of a common resource and a multicomputer system executing the method, wherein the system comprises a plurality of clusters each including a processor, and a common memory which each cluster can access.

(2) Description of the Related Art

In a multicomputer system including a plurality of clusters interconnected through a common memory, when one of the clusters is faulty and breaks down, it is necessary to reset the right to use a common resource which was acquired by the faulty cluster, so as not to effect the operation of other clusters.

Previously the resetting of the right to use a common resource has been carried out by a cluster which detects that another cluster is faulty, and by referring to an identifier (ID) of resource acquisition in the common resource, which cluster is faulty.

As mentioned above, in the prior art, there is a problem as follows. Namely, if the faulty cluster restarts using an IPL (Initial Program Load) and acquires a right to use a common resource, before a cluster which detects the faulty cluster starts to reset the right to use the common resource, the cluster which resets the resource sometimes resets the right to use the common resource which was acquired after the restart of the IPL.

The present invention is intended to solve the above problem.

SUMMARY OF THE INVENTION

An object of the present invention is to provide a control method for preventing the incorrect resetting of a common resource, and a multicomputer system executing the method, wherein when resetting a common resource when a cluster included in a system stops operating due to a fault, the incorrect resetting can be prevented so that the faulty cluster does not reset the right to use the common resource acquired after restart by the IPL.

In one aspect of the present invention, there is provided a control method for preventing the incorrect resetting of a common resource in a multicomputer system comprising a plurality of clusters each including a processor, and a common memory which each cluster can access, comprising steps of storing in the common memory an IPL generation ID (identifier) which is unique to an IPL number of each cluster; setting an acquisition ID and the IPL generation ID in the common resource, when the right to use the common resource in the common memory is acquired; and comparing the IPL generation ID when the faulty cluster stops operating, with the IPL generation ID set in the common resource, and only when the two IPL generation IDs are equal, resetting the right to use the common resource, when a stopped faulty cluster resets the right to use the common resource.

In another aspect of the present invention, there is provided a multicomputer system which executes a control method for preventing the incorrect resetting of a common resource, comprising a plurality of clusters each including a processor, and a common memory which each cluster can access, comprising an IPL generation ID storage for storing a unique ID corresponding to an IPL number of each cluster in the common memory; a resource acquisition information setting portion provided in each cluster for setting an acquisition ID and the IPL generation ID in the common resource, when a cluster acquires the right to use the common resource in the common memory; and a common resource reset portion for resetting common resources of other clusters, provided in each of the plurality of clusters, for comparing the IPL generation ID in the IPL generation ID storage at the time when a faulty cluster stops operating, with the IPL generation ID which is set in the common resource, before one of the plurality of clusters resets the right to use the common resource acquired by the faulty cluster, and only when the two IPL generation IDs are equal, resetting the right to use the common resource.

Other features and advantages of the invention will be apparent from the following description with reference to the accompanying drawings.

BRIEF DESCRIPTION OF THE DRAWINGS

FIG. 5 is a flowchart of a common resource resetting process 19 in the embodiment of FIG. 2.

DESCRIPTION OF THE PREFERRED EMBODIMENTS

Before explaining the preferred embodiment, a problem in the related art will be explained in detail with reference to FIGS. 1A to 1D.

The following explanation is based on an example where clusters 13a and 13b are connected to each other through a common memory 10 and the cluster 13a uses a common resource 12.

Figure 1A:
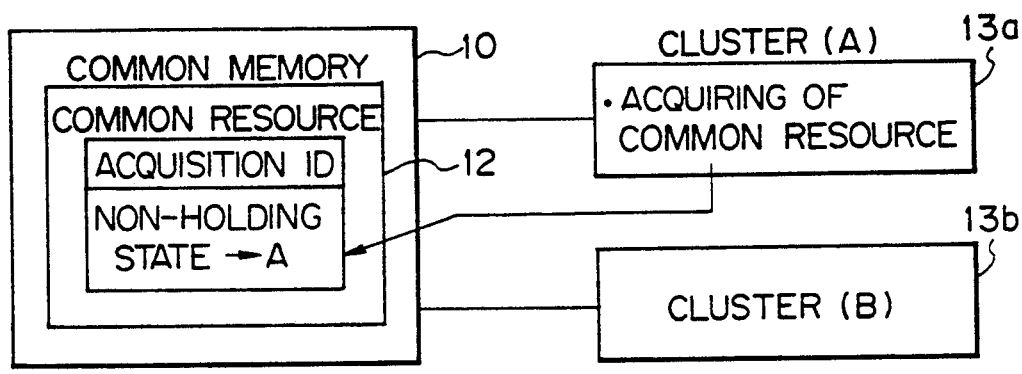
FIGS. 1A, 1B, 1C, and 1D are block diagrams showing a problem in the related art of the present invention.

To acquire a right to use a common resource, as shown in FIG. 1A, the cluster 13a sets an ID A indicating itself, as an acquisition ID, in the common resource 12 for which the right of use is requested.

Figure 1B:
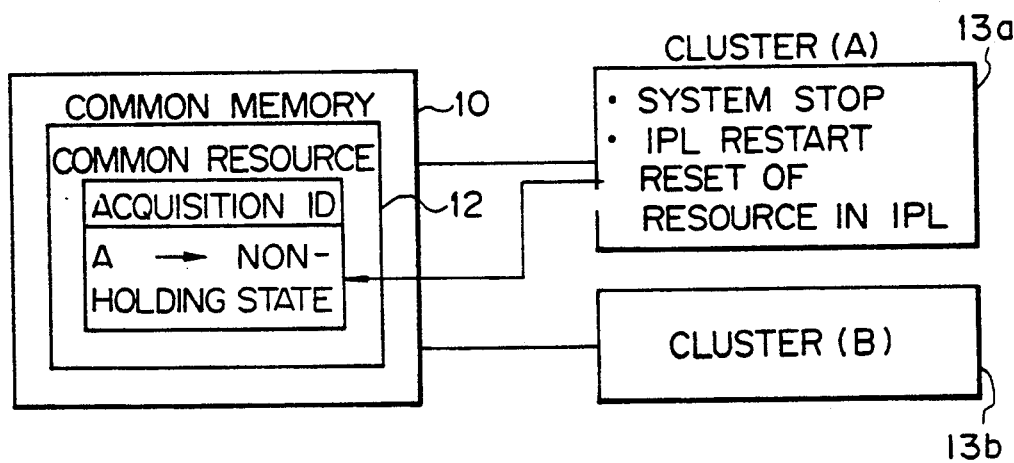

Then as shown in FIG. 1B, the cluster 13a goes down due to a fault, and the system stops operating, and then after being repair, the IPL is carried out again. The cluster 13a then resets the right to use the common resource 12 which was acquired before the fault occurred as a part of the IPL process. In this reset process, the acquisition ID in the common resource 12 is set to a non-holding state.

Figure 1C:
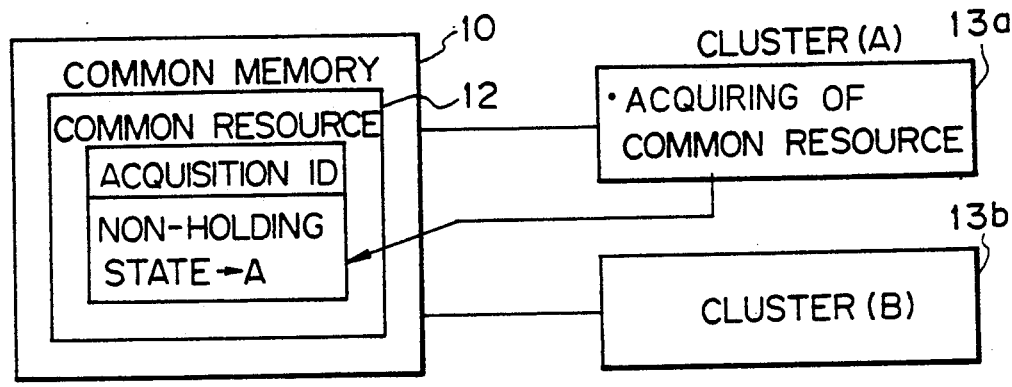

After the right to use the common resource 12 is reset as shown in FIG. 1B, the cluster 13a reacquires the right to use the common resource 12 as shown in FIG. 1C.

Figure 1D:
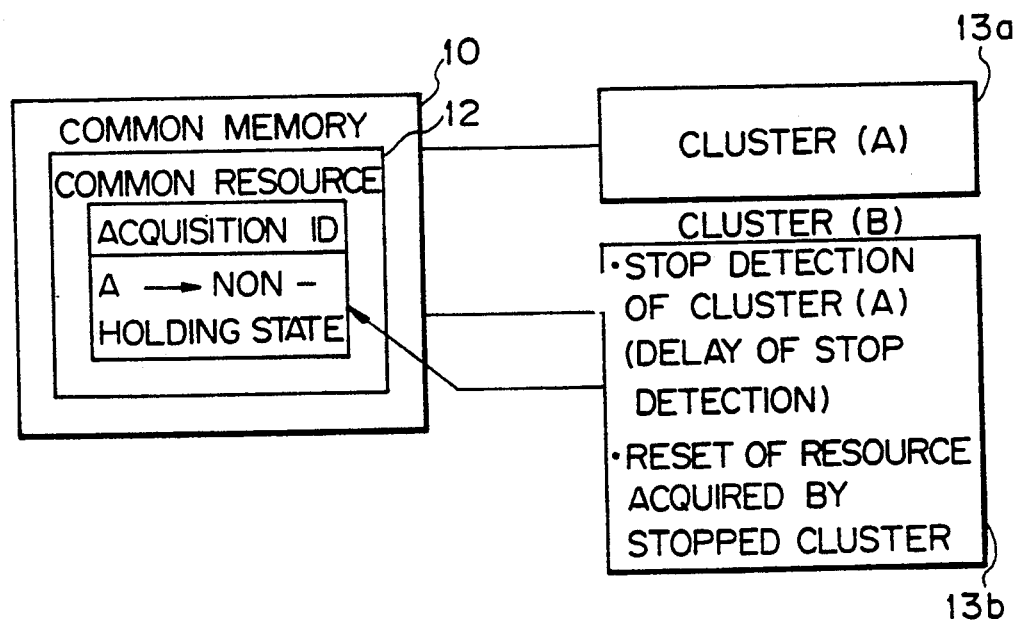

On the other hand, when the cluster 13b detects that the cluster 13a has stopped, the right to use the common resource 12 is reset, as shown in FIG. 1D, to prevent the cluster 13a from holding the acquired right for the common resource 12.

At that time, the cluster 13b resets the right to use the common resource 12 after confirming that the acquisition ID of the common resource 12 is the cluster ID of the cluster 13a, i.e., A. However, since the cluster 13b cannot distinguish whether the acquisition ID is in a failed state, or in the state following the reset of the right to use the common resource 12 by the cluster 13a which then acquires the right again, so the cluster 13b sometimes forces an incorrect resetting of the right to use the common resource 12 reacquired by the cluster 13a even if it is not necessary, particularly when the reset process is delayed.

In addition, the reason the cluster 13a reset the right to use the common resource 12 by itself at the time of reestablishment of IPL is because it was able to reuse of the common resource 12 in a case where the system is constituted by only one cluster. Further, in the case where the IPL cannot be immediately restarted, cluster 13b resets the right to use the common resource 12 which was acquired by the faulty cluster 13a, so that the common resource 12 can be used by other clusters.

Figure 2:
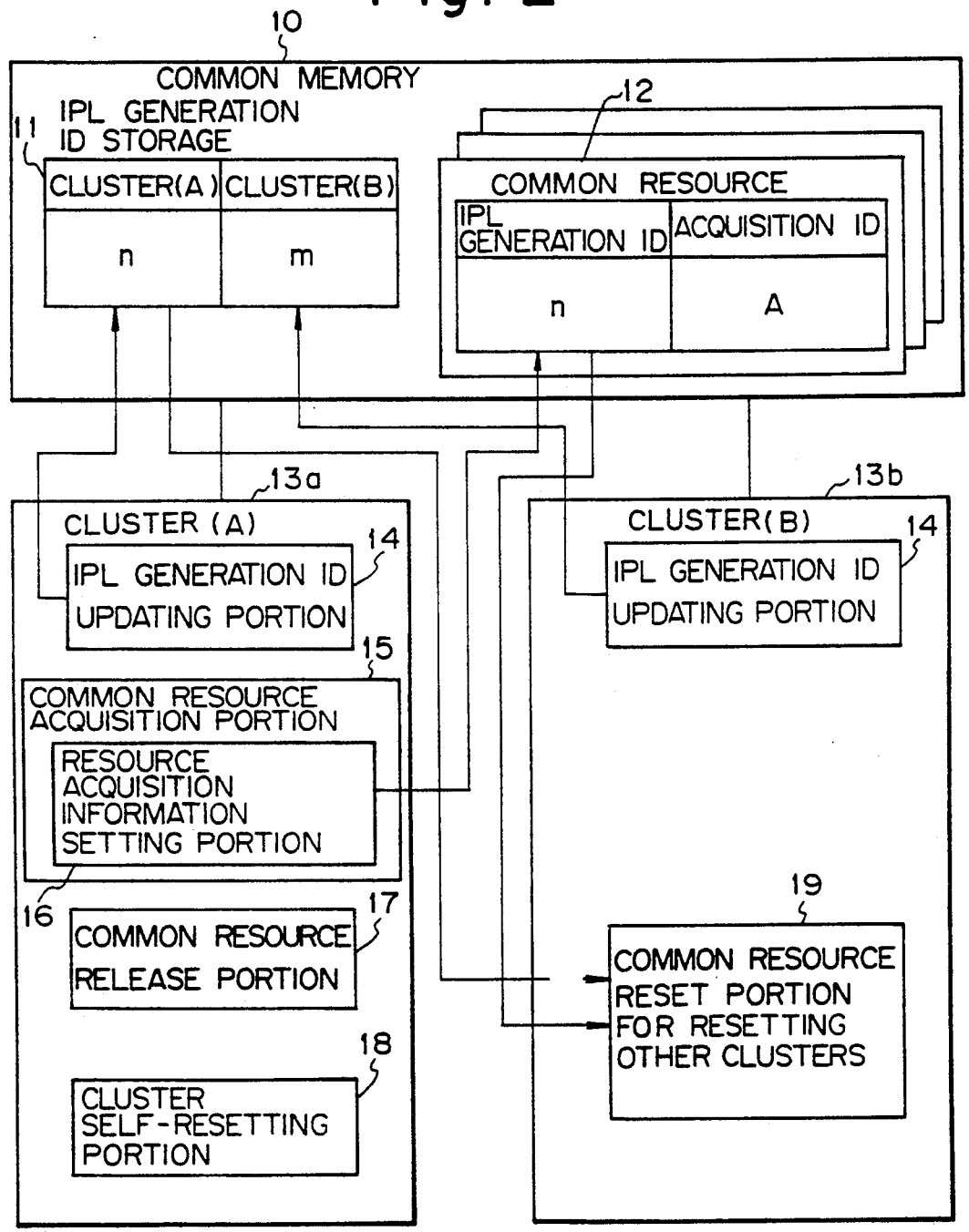
FIG. 2 is a block diagram for explaining a summary of an embodiment of the invention.

An embodiment of the present invention is explained summarizedly with reference to FIG. 2.

In FIG. 2, reference numeral 10 denotes a common memory, 11 is an IPL generation ID storage for storing IPL generation IDs corresponding to each cluster and each IPL, 12 is a common resource, 13a and 13b are clusters each provided with a processor that can operate independently, 14 is an IPL generation ID updating portion or process updating the IPL generation ID in the IPL generation ID storage 11 at the time of IPL, 15 is a common resource acquisition portion for acquiring the right to use the common resource 12, 16 is a resource acquisition information setting portion for setting the IPL generation ID and the acquisition ID in the common resource 12, 17 is a common resource release portion for releasing the acquired right to use the common resource 12, 18 is a cluster self-resetting portion for resetting a common resource, and 19 is a common resource reset portion or process for resetting other clusters when a cluster is faulty.

The clusters 13a and 13b are connected to the common memory 10 and constitute a multicomputer system.

The IPL generation ID storage 11 is provided in the common memory 10, and when the IPL is executed in the cluster 13a or 13b, the updating of the IPL generation ID is carried out by using the IPL generation ID updating portion 14. The IPL generation ID has a unique value corresponding to each IPL. The unique value is a number that is incremented by one when or each time an IPL process is executed.

The common resource 12 functions as, for example, a lock word of a control table utilized commonly by clusters 13a and 13b. In this embodiment, besides the acquisition ID corresponding to the cluster holding the right to use a resource in the common resource 12, a field is provided for setting the IPL generation ID of a cluster which has acquired the right to use the common resource.

When the right to use the common resource 12 is acquired by the common resource acquisition portion 15, the resource acquisition information setting portion 16 sets the IPL generation ID and the acquisition ID in the common resource 12.

The common resource release portion 17 clears the IPL generation ID and the acquisition ID in the common resource 12, when the use of the common resource 12 ends.

The cluster self-resetting portion 18 for resetting a common resource resets the right to use the common resource 12 which is acquired by that cluster and puts the IPL generation ID and the acquisition ID in a non-holding state when the cluster is faulty and executes IPL again.

The common resource reset portion or process 19 for resetting other clusters resets the right to use the common resource 12 which is held by the faulty cluster, when a faulty cluster in another cluster is detected. Particularly in this embodiment, the IPL generation ID at the time when the faulty cluster stops is compared with the IPL generation ID set in the common resource 12. Only if the two IPL generation IDs are equal, the right to use the common resource 12 reset.

In FIG. 2, to simplify the explanation, the processing structures of the clusters 13a and 13b are shown separately. However, the constitutions of the two clusters are actually symmetrical, and the clusters monitor each other mutually using the same processing structure. The same applies in the case of three or more clusters.

In this embodiment, when the right to use the common resource 12 is acquired by a cluster, the IPL generation ID corresponding to that cluster is set in the common resource. If the cluster stops operating while it is holding the right to use the common resource 12, for all of the rights being held for the common resources 12, the acquisition ID and the IPL generation ID set in the common resource 12 are compared with a cluster ID and IPL generation ID corresponding to the faulty cluster. If these IDs coincide, it is determined that the faulty cluster is holding the right to use the common resource and the reestablishment of the IPL has not been executed, and the right to use the common source 12 is reset.

Accordingly, when a cluster in the system stops operating while it is holding the right to use the common resource 12, another cluster immediately resets the right to use the common resource 12. Thus, a wait state for other clusters to acquire the right to use the common resource 12 is avoided by eliminating the need for the faulty cluster to reset the right to use the common resource 12.

Further, in a case where a faulty cluster reestablishes the IPL and the right to use the common resource 12 is reset and then acquired, since the IPL generation ID set in the common resource 12 is updated, an incorrect resetting of the right to use the common resource 12 by another cluster can be avoided.

The embodiment of this invention will now be explained in detail. FIGS. 3A to 3D show operation of process according this embodiment, FIGS. 4A to 4C show an example of the operation of this embodiment, and FIG. 5 shows a flowchart of the resetting process of the common resource by another cluster.

First, the cluster IPL, common resource acquisition, release, and common resource reset processes are explained.

Figure 3A:
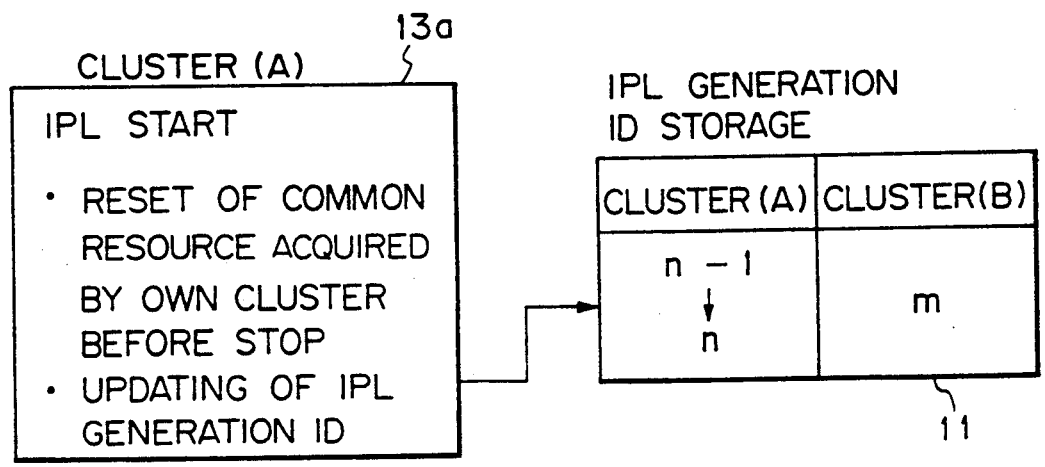
FIGS. 3A, 3B, 3C, and 3D are block diagrams for explaining a process of the embodiment of FIG. 2.
Figure 4A:
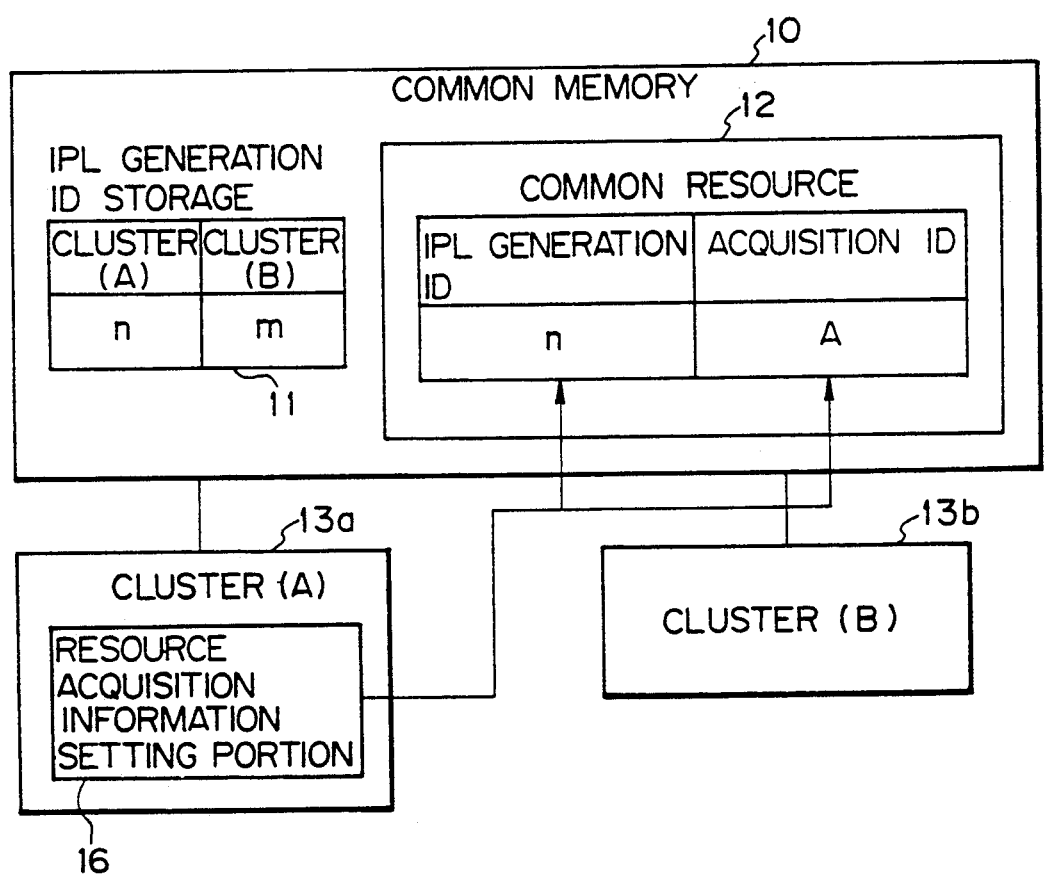
FIGS. 4A, 4B, and 4C are block diagrams for explaining an operational example of the embodiment of FIG. 2.
Figure 4B:
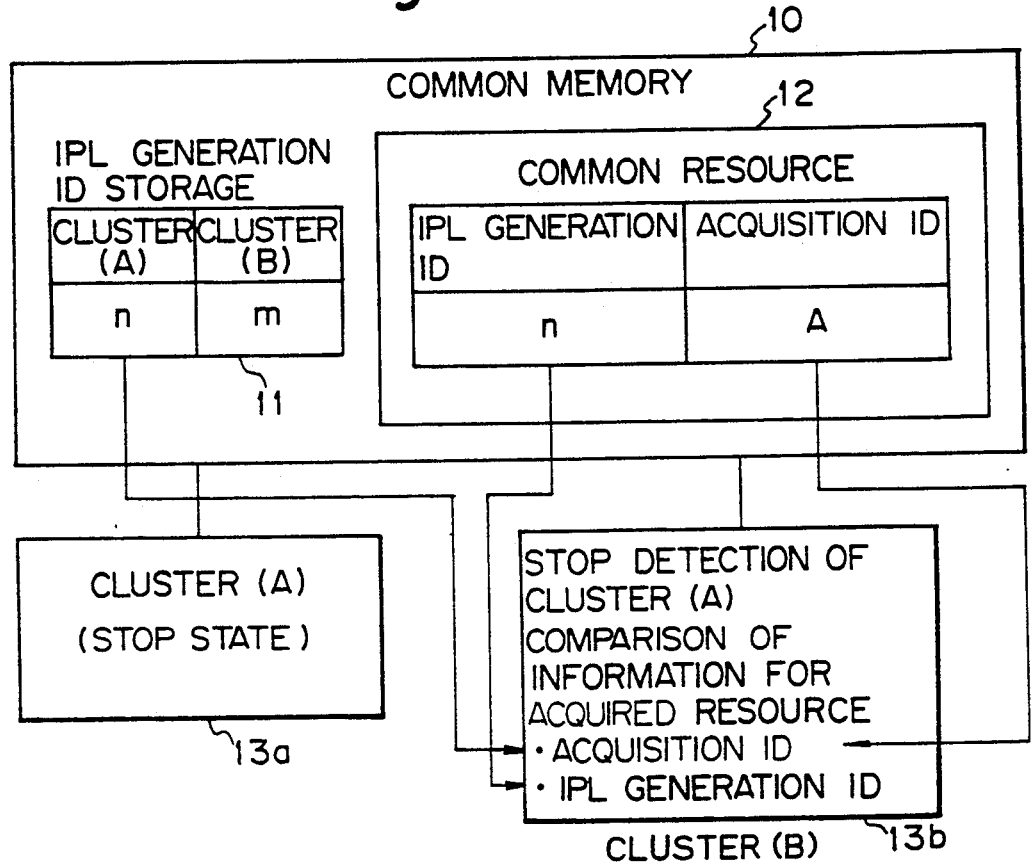
Figure 4C:
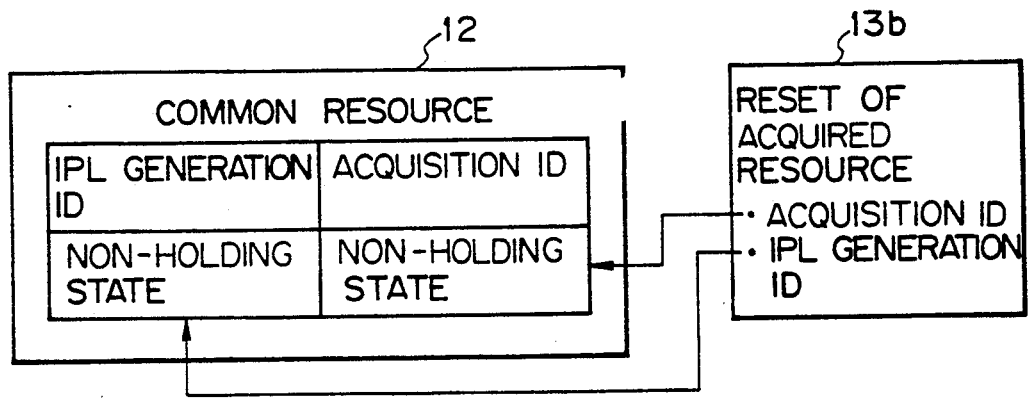

As shown in FIG. 3A, in the IPL (Initial Program Load) process of the cluster 13a, the right to use the common resource which was acquired before the cluster itself stopped, is reset, and the IPL generation ID for that cluster in the IPL generation ID storage 11 is increased by one.

Figure 3B:
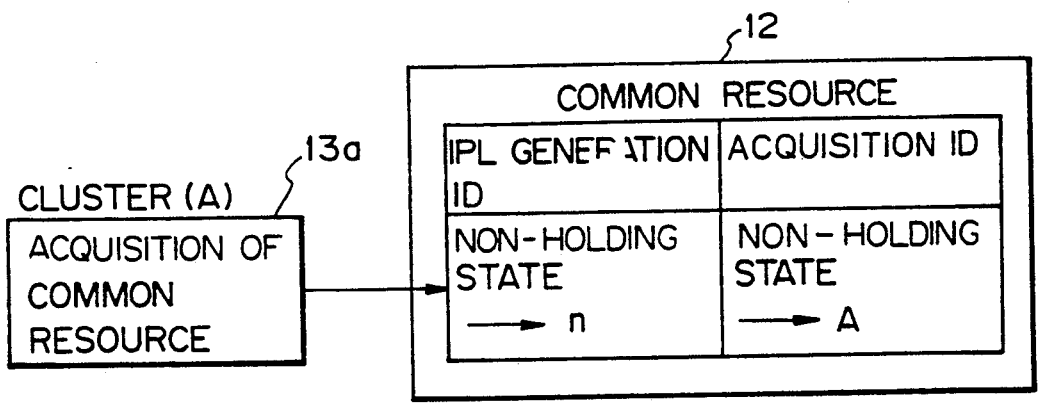

In the case when the cluster 13a acquires the right to use the common resource 12, as shown in FIG. 3B, an ID A for that cluster is set to in the acquisition field in the common resource 12, and simultaneously an IPL generation ID n stored in the IPL generation ID storage 11 is set in the IPL generation ID field in the common resource 12.

Figure 3C:
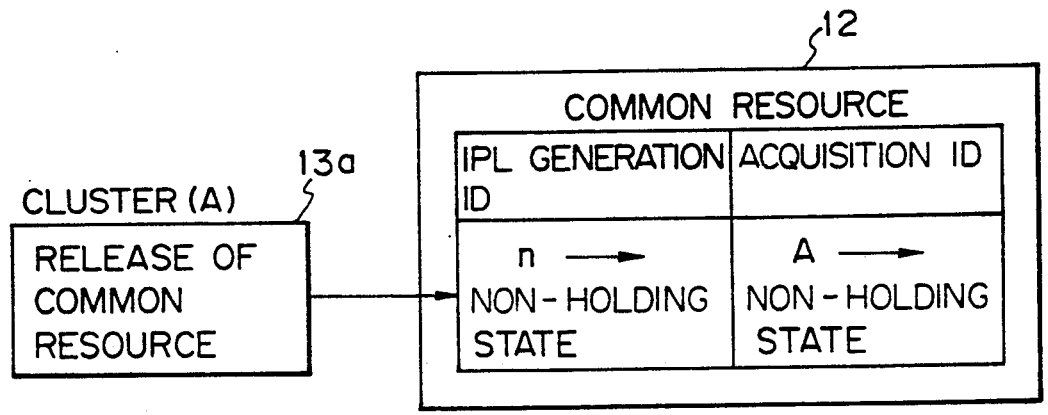

In releasing the right to use the common resource 12, as shown in FIG. 3C, the IPL generation ID field and the acquisition ID field in the common resource 12 are initialized and put in a non-holding state.

Figure 3D:
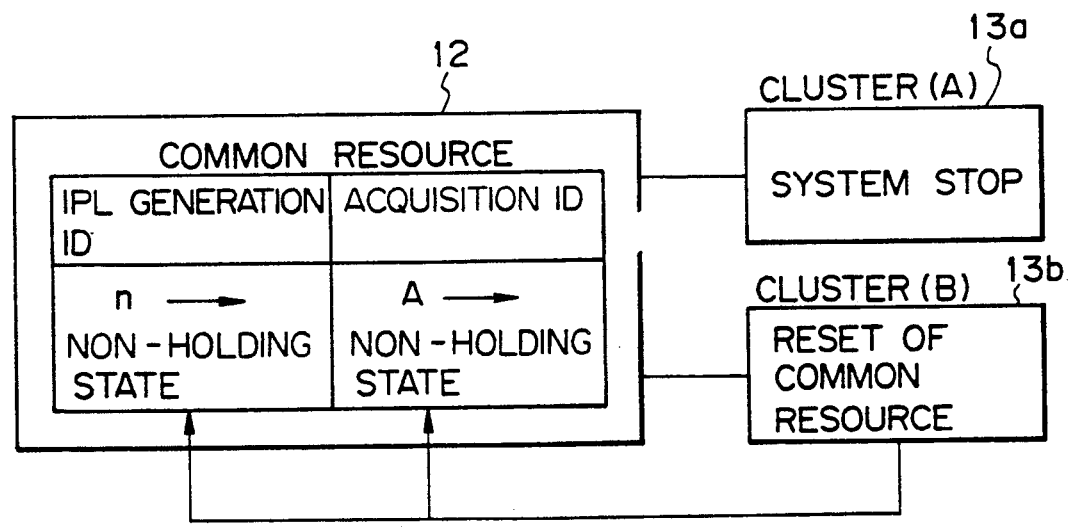

When the cluster 13a stops the system while holding the right to use the common resource 12, as shown in FIG. 3D, another cluster 13b resets the right to use the common resource 12, and the fields of the IPL generation ID and the acquisition ID in the common resource 12 are initialized to the non-holding state.

This invention particularly relates to the resetting of the right to use the common resource 12. Namely, when the cluster 13a reestablishes the IPL and resets the right to use the common resource by itself, and further reacquires the right of use, the reset of the right to use the common resource 12 by the cluster 13b is suppressed.

The above operating example is explained with reference to FIGS. 4A to 4C.

When the cluster 13a obtains the right to use the common resource 12, as shown in FIG. 4A, the current IPL generation ID n and the acquisition ID A for that cluster are set in the common resource 12 by the resource acquisition information setting portion or process 16. It is assumed that in this state the cluster 13a is faulty. When the cluster 13b detects the system being stopped by the cluster 13a, as shown in FIG. 4B, the cluster 13b reads the IPL generation ID n corresponding to the cluster 13a at that time from the IPL generation ID storage 11. After that, all of the common resource 12 is searched to find the common resource wherein the acquisition ID is A corresponding to the cluster 13a, and the IPL generation ID is n, and the right to use the common resource 12 is reset.

If the acquisition ID A and the IPL generation ID n in the common resource 12 coincide to the above read IDs, as shown in FIG. 4C, the cluster 13b resets the right to use the common resource 12, and the fields of the IPL generation ID and the acquisition ID in the common resource are put in a non-holding state. If the acquisition IDs coincide and the IPL generation IDs do not coincide, the corresponding common resource 12 is determined to be the common resource that was reacquired by that cluster and the right to use the common resource 12 is not reset. Accordingly, the reset operation can be surely executed and an incorrect resetting of resources is prevented.

FIG. 5 shows a process flowchart of the common resource reset portion 19 for resetting another cluster shown in FIG. 2. The process flow is explained with reference to steps S1 to S6 shown in FIG. 5.

S1: When a fault in another cluster is detected by a fault detection portion (not shown in the figure), the IPL generation ID at the time the cluster becomes faulty, and the cluster ID for the faulty cluster are acquired from the storage 11 and the fault detection operation, respectively.

S2: The information in each common resource 12 is compared with the information acquired in the step S1.

S3: If the cluster ID of the faulty cluster coincides with the acquisition ID in the common resource 12, the process proceeds to the next step S4. If the cluster ID does not coincide with the acquisition ID, the process proceeds to the step S6, since the right to use the common resource 12 has not been acquired by the faulty cluster.

S4: When the IPL generation ID at the time the cluster becomes faulty is equal to the IPL generation ID in the common resource 12, the process proceeds to the next step S5, and if not equal, the process proceeds to the step S6.

S5: In order to reset the right to use the common resource 12, a resource holding information in the common resource 12 is put in a non-holding state. Namely, the IPL generation ID and the acquisition ID in the common resource 12 are initialized to zero.

S6: It is determined whether the above process has ended for all the common resources 12, and if ended, the process of resetting the resource ends. If an unprocessed common resource exists, the process returns to the step S2 and the subsequent steps are repeated.

We claim:

1. A control method for preventing incorrect resetting of a common resource in a multicomputer system comprising clusters each including a processor, and a common memory which each cluster can access, said method comprising steps of:
   storing in the common memory an initial program load generation identifier which is unique to each initial program load of each cluster;
   storing an acquisition identifier, identifying the cluster acquiring access to the common resource, and the initial program load generation identifier in the common resource, when a right to use the common resource in the common memory is acquired; and
   comparing the initial program load generation identifier stored int he common memory when a faulty cluster stops, with the initial program load generation identifier stored in the common resource, and only when the initial program load generation identifiers are equal, resetting the right to use the common resource, when the stopped faulty cluster resets the right to use the common resource.

2. A multicomputer system which executes a control method for preventing incorrect resetting of a common resource, comprising:
   clusters each including a processor; and
   a common memory connected to said clusters and which each cluster can access, and storing the common resource, said common memory comprising an initial program load generation identifier storage for storing a unique initial program load generation identifier corresponding to an initial program load number of each cluster in the common memory; and
   each cluster comprising:
      a ı source acquisition information setting process ₚ.·ovided in each cluster for setting an acquisition identifier and the initial program load generation identifier in the common resource, when one of the clusters acquires a right to use the common resource in the common memory; and
      a common resource reset process for resetting the common resource of other clusters, provided in each of the clusters, for comparing the initial program load generation identifier in the initial program load generation identifier storage at a time when a faulty cluster stops operating, with the initial program load generation identifier which is set in the common resource, before one of the clusters resets the right to use the common resource acquired by the faulty cluster, and only when the initial program generation identifiers are equal, resetting the right to use the common resource.

3. A multicomputer system as set forth in claim 2, wherein each cluster further comprises:
an initial program load generation identifier process for updating the initial program load generation identifier in the initial program load generation identifier storage at initial program load time;
a common resource acquisition process which is loaded by the resource acquisition information setting process and for acquiring the right to use the common resource;
a common resource release process for releasing the acquired right to use the common resource; and
a cluster self-resetting process for resetting the right to use the common resource which is acquired at the initial program load time.

4. A multicomputer system, comprising:
at least two cluster processors; and
a common memory connected to said processors and comprising:
common resource storage memory storing common resource data accessible by said processors;
acquisition identification storage memory storing an access indicator indicating which of the processes has access to the common resource data;
resource generation identification storage memory storing a load generation identifier of the processor which has access to the common resource data; and
cluster generation identification storage memory storing load generation identifiers of the processors identifying a generation of initial program loading for each of the processors.

5. A system as set forth in claim 4, wherein each of said processors comprises:
means for generating a new load generation identifier each time an initial program load occurs and storing the new load generation identifier in said cluster generation identification storage memory; and
means for changing the access indicator when another cluster processor has a fault and the load generation identifier in said resource generation identification storage memory of the cluster with the fault matches the load generation identifier stored in said cluster generation identification storage memory.

6. A system as set forth in claim 5, wherein each of said processors further comprise means for changing the access identifier when said processor releases the common resource for access by the other cluster processor.

* * * * *

UNITED STATES PATENT AND TRADEMARK OFFICE
CERTIFICATE OF CORRECTION

PATENT NO. :   5,301,311
DATED      :   April 5, 1994
INVENTOR(S):   Fushimi et al.

It is certified that error appears in the above-identified patent and that said Letters Patent is hereby corrected as shown below:

Column 3, line 30, after "process" insert --for--.

Column 6, line 32, delete "int he" and substitute "in the".

Signed and Sealed this

Thirtieth Day of August, 1994

Attest:

BRUCE LEHMAN

Attesting Officer

Commissioner of Patents and Trademarks